United States Patent [19]
Sandlin

[11] Patent Number: 5,899,698
[45] Date of Patent: *May 4, 1999

[54] LANGUAGE TRANSLATION PAD

[76] Inventor: Brad A. Sandlin, 330 Roberts St. Suite 200, East Hartford, Conn. 06108

[ * ] Notice: This patent is subject to a terminal disclaimer.

[21] Appl. No.: 08/947,309

[22] Filed: Oct. 8, 1997

Related U.S. Application Data

[63] Continuation-in-part of application No. 08/655,607, Sep. 3, 1996, Pat. No. 9,782,640.

[51] Int. Cl.$^6$ .................................................. G09B 19/08
[52] U.S. Cl. .............................................................. 434/157
[58] Field of Search .................................... 434/156, 157, 434/159, 167; D19/1; 283/45, 46

[56] References Cited

U.S. PATENT DOCUMENTS

| | | |
|---|---|---|
| 3,190,013 | 6/1965 | Cuttat . |
| 3,271,884 | 9/1966 | Roberson . |
| 3,888,025 | 6/1975 | Schmieder . |
| 4,336,020 | 6/1982 | Zacharin . |
| 4,404,764 | 9/1983 | Wills et al. . |
| 4,713,008 | 12/1987 | Stocker et al. . |
| 4,802,855 | 2/1989 | Wood . |
| 5,167,504 | 12/1992 | Mann . |
| 5,178,542 | 1/1993 | Chigrinsky et al. . |

FOREIGN PATENT DOCUMENTS

| | | |
|---|---|---|
| 521784 | 7/1921 | France . |
| 234757 | 10/1989 | Russian Federation . |
| 12735 | 9/1908 | United Kingdom . |
| 1578649 | 11/1980 | United Kingdom . |

OTHER PUBLICATIONS

English Language Abstract of USSR 234757.

Primary Examiner—Kien T. Nguyen

[57] ABSTRACT

Note pad sheets bear indicia for teaching foreign words or phrases, keyed to a particular letter of the alphabet.

13 Claims, 8 Drawing Sheets

Pronunciation Guide

| Spanish Letter | Pronunciation |
|---|---|
| a | Like English *a* in *father* |
| b,v | At beginning of word group and after *m* or *n*, like English *b* |
| | Elsewhere, like English *v*, but pronounced with both lips instead of upper teeth and lower lip |
| c | Before *e* or *i*, and sometimes at the end of words, like English *th* in *thin* (in Northern Spain); like Spanish *s* (in Southern Spain and the Americas). |
| d | At beginning of word group and after *n* or *l*, like English *d* |
| | Elsewhere, like English *th* in either |
| e | Like English *e* in *bet* |
| f | As in English |
| g | Before *e* or *i*, the same as Spanish *j* |
| gu | Before *e* or *i*, like English *g* in *get* |
| | Elsewhere, like English *gw* in *Gwynn* |
| gü | Like English *gw* in *Gwynn* |
| h | Silent. |
| i | Like English *i* in machine, but more clipped |
| | Before or after another vowel, like English *y* (except when accented) |
| j | Like English *h*, but more rasping |
| k | As in English |
| l | Like Engish *l* in *like*, but with the tongue behind the upper front teeth |
| ll | Like English *lli* in *million* (Northern Spain); like Spanish *y* (in Southern Spain and the Americas) |
| m | As in English |
| n | As in English |
| ñ | Like English *ny* in *canyon* |
| o | Approximately like English *o* in *vote*, but more clipped |
| p | As in English |
| qu | Like English *k* |
| r | Not at all like American English *r*; a quick flap of the tongue-tip on the roof of the mouth |
| rr | A srtongly "rolled" or trilled version of Spanish *r* |
| s | Like English *s* in *lease* |
| t | As in English |
| u | Like English *oo* in *boot*, but more clipped |
| | Before *e* or after another vowel, like English *w* (except when accented) |
| v | See *b* above |
| x | Like English *x*; although before consonants many speakers pronounce it like Spanish *s* |
| y | Approximately like English *y* in *yes* |
| z | Like English *th* in *thin* (in Northern Spain); like English *s* in *lease* (in Southern Spain and the Americas) |

LANGUAGE TRANSLATION PAD

CROSS-REFERENCE TO RELATED APPLICATION

This is a continuation-in-part of application for letters patent Ser. No. 08/655,607, filed May 3, 1996 and now issued as U.S. Pat. No. 5,782,640.

BACKGROUND OF THE INVENTION

This invention relates to the teaching of languages and, more particularly, to a note pad that functions as a language teaching device A variety of techniques and mediums are utilized for language instruction. Typically, they involve single word translation and employ aids such as flash cards, books, and other devices that are especially designed for that purpose. A common prerequisite to the effective use of all of such prior art teaching aids is however an intent to teach or learn a second language; moreover, in many instances the format and/or presentation of such devices is not conducive to the learning exercise.

Note pads are of course in common, everyday use, such as for making shopping lists, for recording phone numbers and other information, for mere doodling, etc. Children like to use such pads especially for drawing and coloring.

SUMMARY OF THE INVENTION

Accordingly, it is a broad object of the present invention to provide a device for the self-teaching of language translation, which device also promotes letter recognition.

A more specific object of the invention is to provide such a device by which learning is enabled as an incidental benefit of another utility.

A further specific object of the invention is to provide a note pad having the foregoing features and advantages, which is so constructed as to encourage use and as to facilitate learning.

It has now been found that the foregoing and related objects of the invention are attained by the provision of a device comprised of a multiplicity of sheets of paper, stacked one upon another and bound together adjacent a common edge, each sheet having an indicia-bearing writing surface. The indicia include first and second expressions, each comprising at least one word, as well as means for distinguishing one of the letters forming the "first" expression. The first expression is a word or phrase employed in a first language, and the second expression corresponds in meaning to the first and is employed in a different language; different expressions are provided on each of a plurality of the sheets. Thus, a person knowing one language can learn expressions in another simply by observing, in the course of using the pad, the indicia borne on the several sheets The letter-distinguishing means may comprise means for emphasizing the selected letter in at least one word of the first expression, and may for example take the form of a mark (e.g., underscoring) applied to that letter; emphasis may also be provided, by using a different size, font, style, color, etc., in printing the letter. The "one" word of the first expression will often begin with the designated letter, in which case the indicia may further comprise a representation of that letter, separate from the first expression, thus constituting the distinguishing means.

The indicia borne by the sheets will preferably include a pictorial representation corresponding in meaning to the first and second expressions, and/or a phonetic representation of at least one of the first and second words. In most instances at least the majority of letters of which the alphabet employed is constituted will be represented on at least one sheet of the device, and the sheets will normally be so arranged as to conform to the customary, alphabetic order of the letters. In especially desirable embodiments of the device the expressions on the sheets will comprise the vocabulary of a common topic, e.g., travel, sports, business, adult-oriented subjects, adolescent-oriented subjects, and juvenile-oriented subjects.

BRIEF DESCRIPTION OF THE DRAWINGS

FIG. 3 is a view of the back, or bottom, of the pad;

In the several figures, the same numbers are used throughout to designate common elements.

DETAILED DESCRIPTION OF THE PREFERRED AND ILLUSTRATED EMBODIMENTS

Turning initially to FIGS. 1 through 4 of the drawings, therein illustrated is a note pad embodying the present invention and generally designated by the numeral 10. The pad 10 consists of a stack of printed sheets 12 of paper (the top one of which, 12a, is shown in the course of removal), bonded together by an adhesive deposit 14 formed along one common edge (i.e., at a common plane on which one edge of each sheet lies) and mounted on a cardboard backing panel 16. Each sheet 12 of the pad bears an emphasized letter and serves, in this embodiment, to translate a single word from English to Spanish; the sheets are arranged in customary, English language alphabetic order.

Figure 1:
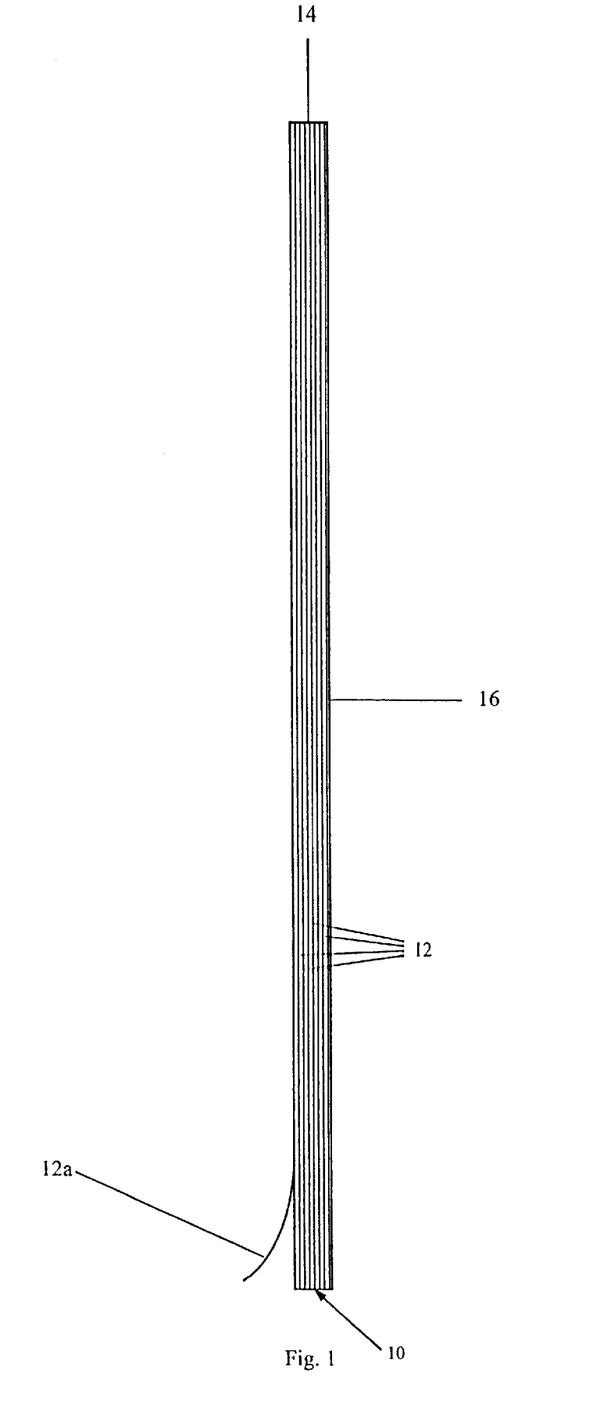
FIG. 1 is a diagrammatic side elevational view of a note pad embodying the present invention.
Figure 2:
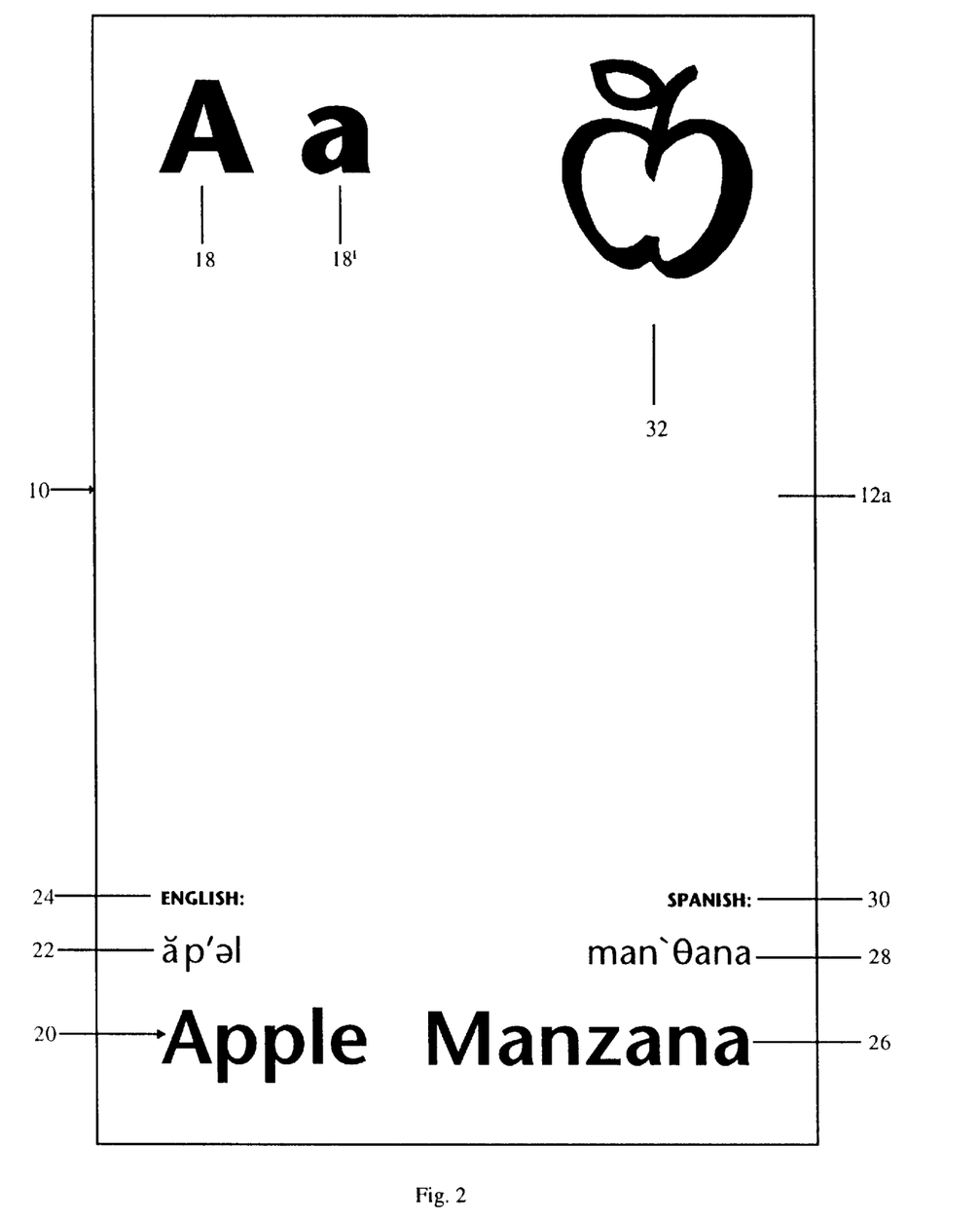
FIG. 2 is a view of the front, or top, of the pad of FIG. 1.

More specifically, and as can be seen from FIG. 2, the first page 12a of the pad 10 is printed with an upper case letter 18 and a lower case letter 18' ("A" and "a") corresponding to the first letter of the subject word ("apple"), which is generally designated by the numeral 20. A phonetic representation of the word is shown at 22, and the key at 24 indicates that the word and the phonetic equivalent are expressed in English; the corresponding word and phonetic expression in Spanish (as indicated at 30) are shown at 26 and 28, respectively. A pictorial illustration of an apple is shown at 32.

Figure 4:
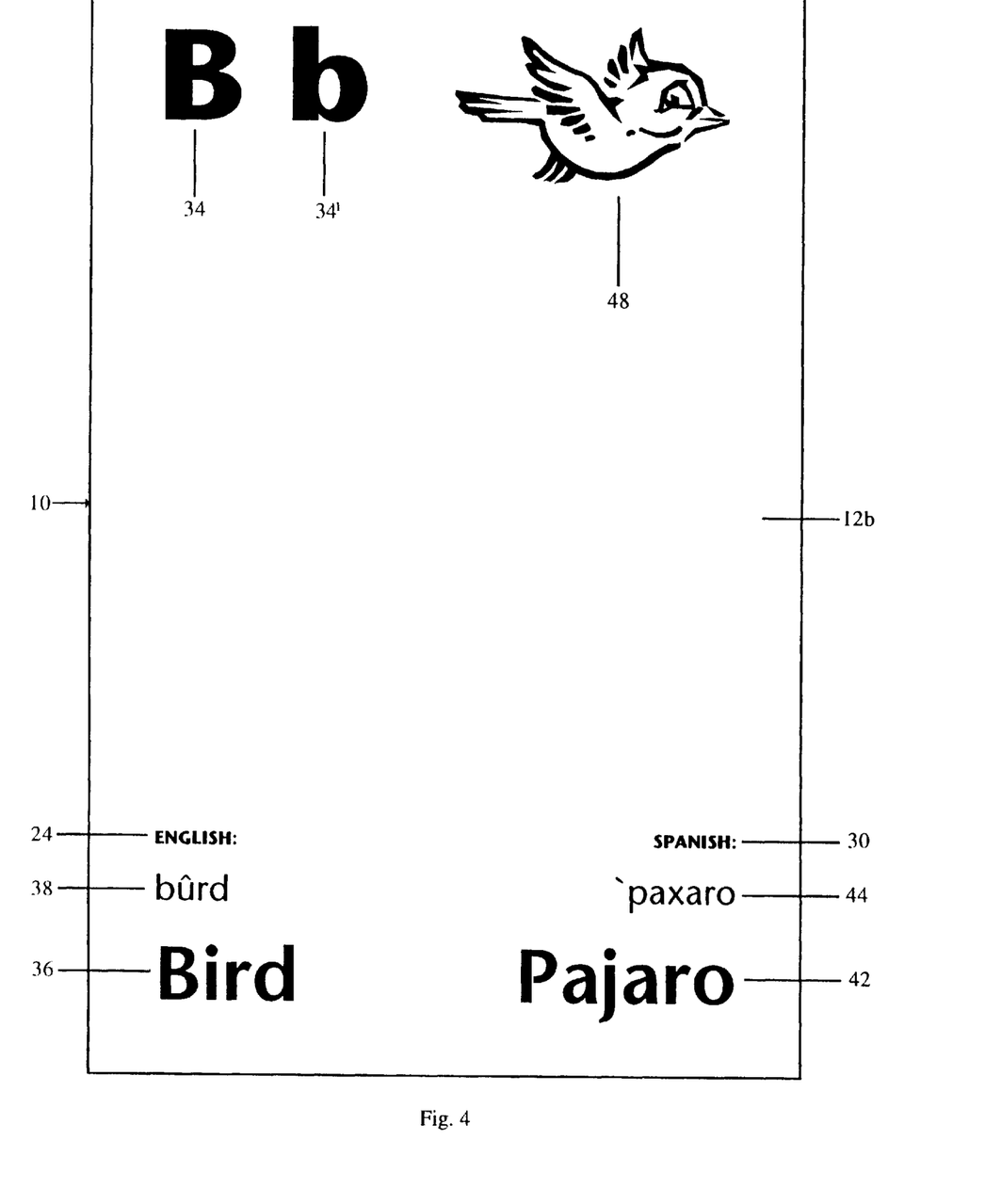
FIG. 4 is a front view of the pad with the first sheet of paper removed and showing the second sheet.

The second page 12b of the pad 10 represents a word beginning with the letter "B," shown in upper and lower case at 34 and 34', respectively. The word "bird" is printed at 36, the English phonetic representation is shown at 38, the corresponding Spanish word and phonetic representation are shown at 42 and 44, respectively, and the pictorial representation is shown at 48. Because the pad 10 is intended for an English-speaking user, the guide printed on the back panel 16 is expressed in English to facilitate Spanish pronunciation.

Figure 5:
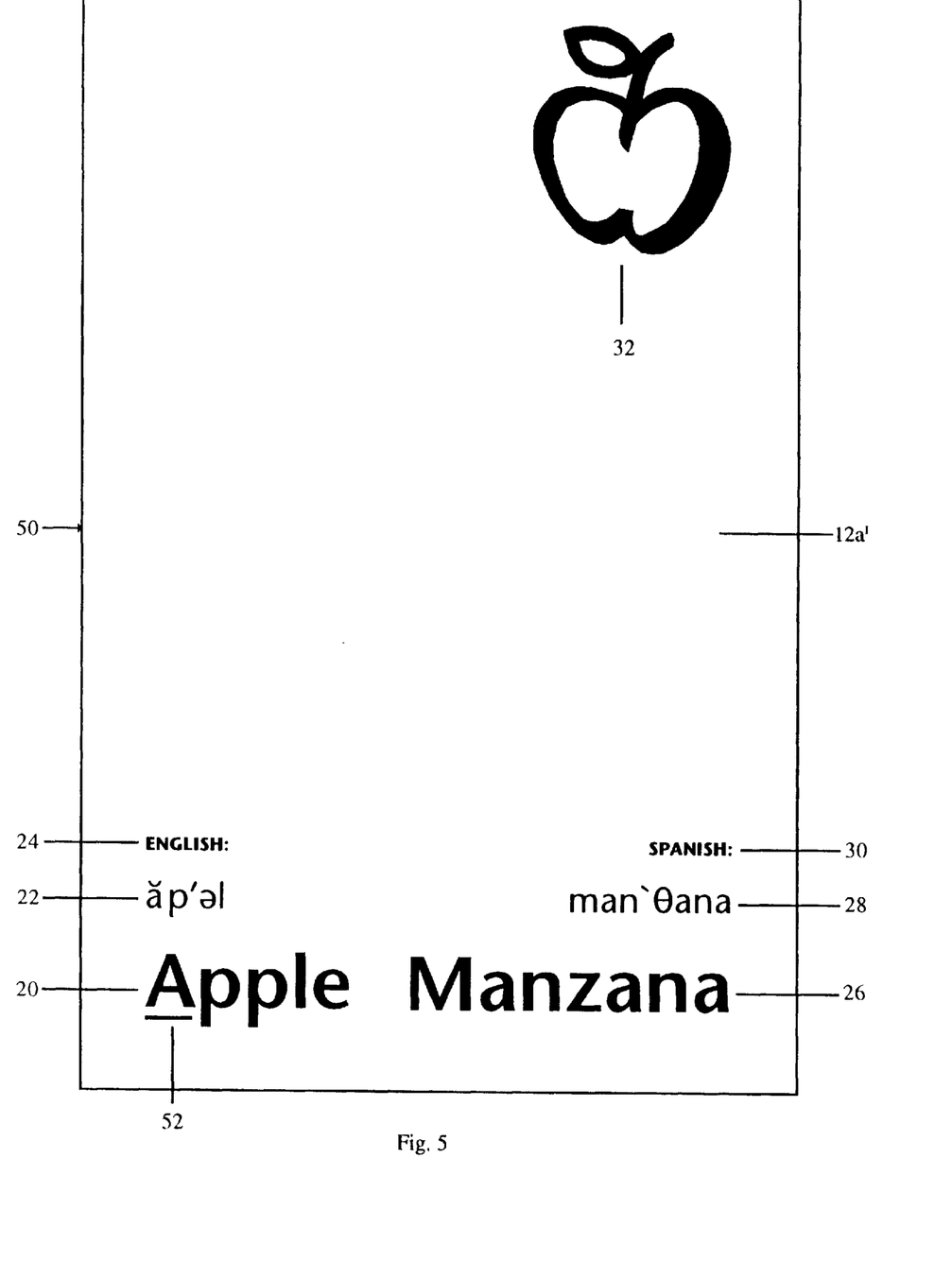
FIG. 5 is a front view of a second form of pads embodying the invention.

An alternative form of the pad, generally designated by the numeral 50, is shown in FIG. 5. The first sheet 12a' corresponds to the first sheet 12a of the pad 10, but rather than bearing separate letter designations the particularized letter "A" is emphasized in this instance by underlining, at 52, in the word "apple."

Figure 6:
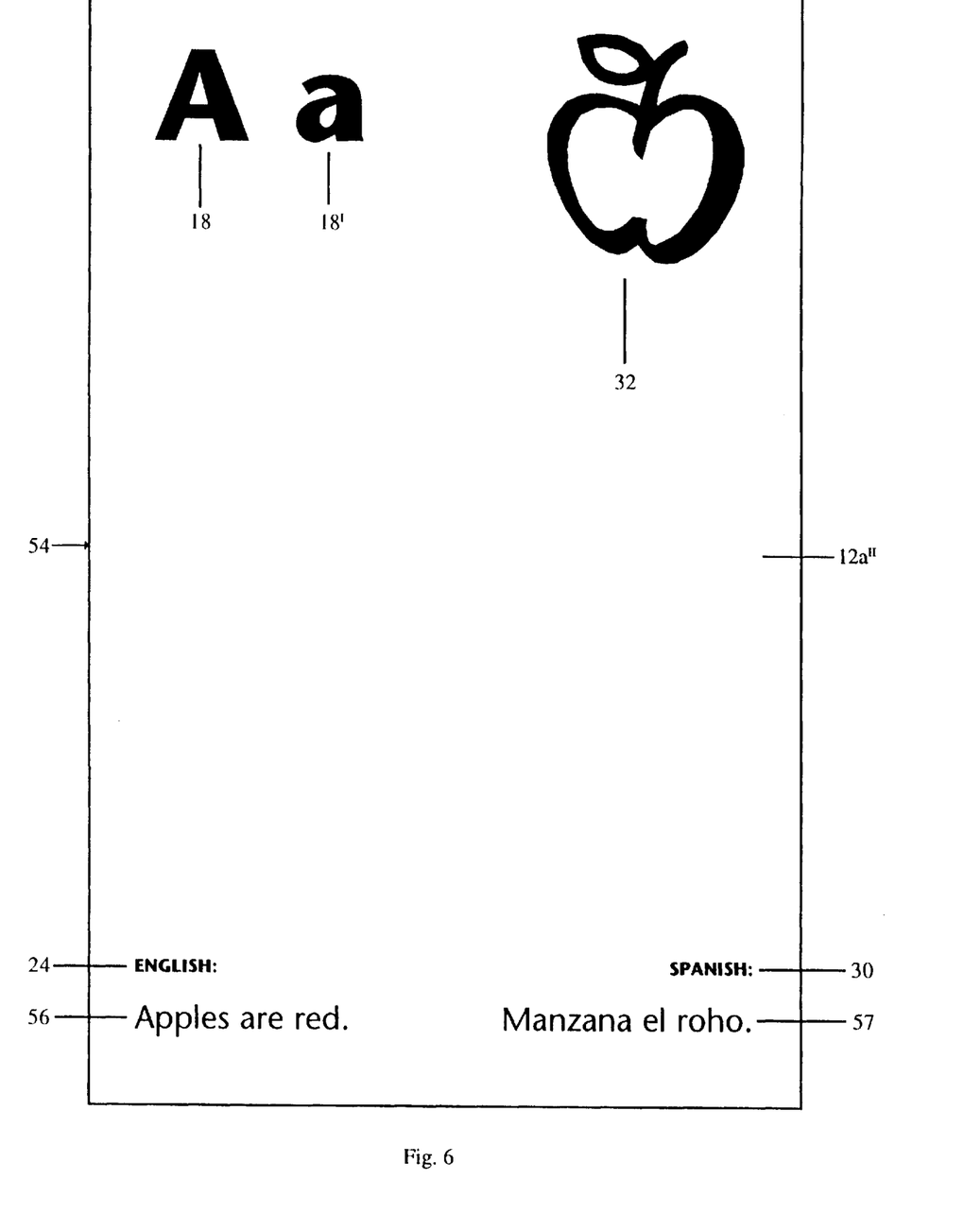
FIGS. 6, 7, and 8 are front elevational views of additional embodiments of the pads of the invention.

A second alternative form of the pad, generally designated by the numeral 54, is shown in FIG. 6. In this instance a phrase, rather than a single word, is shown in English at 56 on the first sheet of the pad 12a", with its corresponding Spanish phrase being shown at 57; the first word of the phrase 56 begins with the designated letter.

Figure 7:
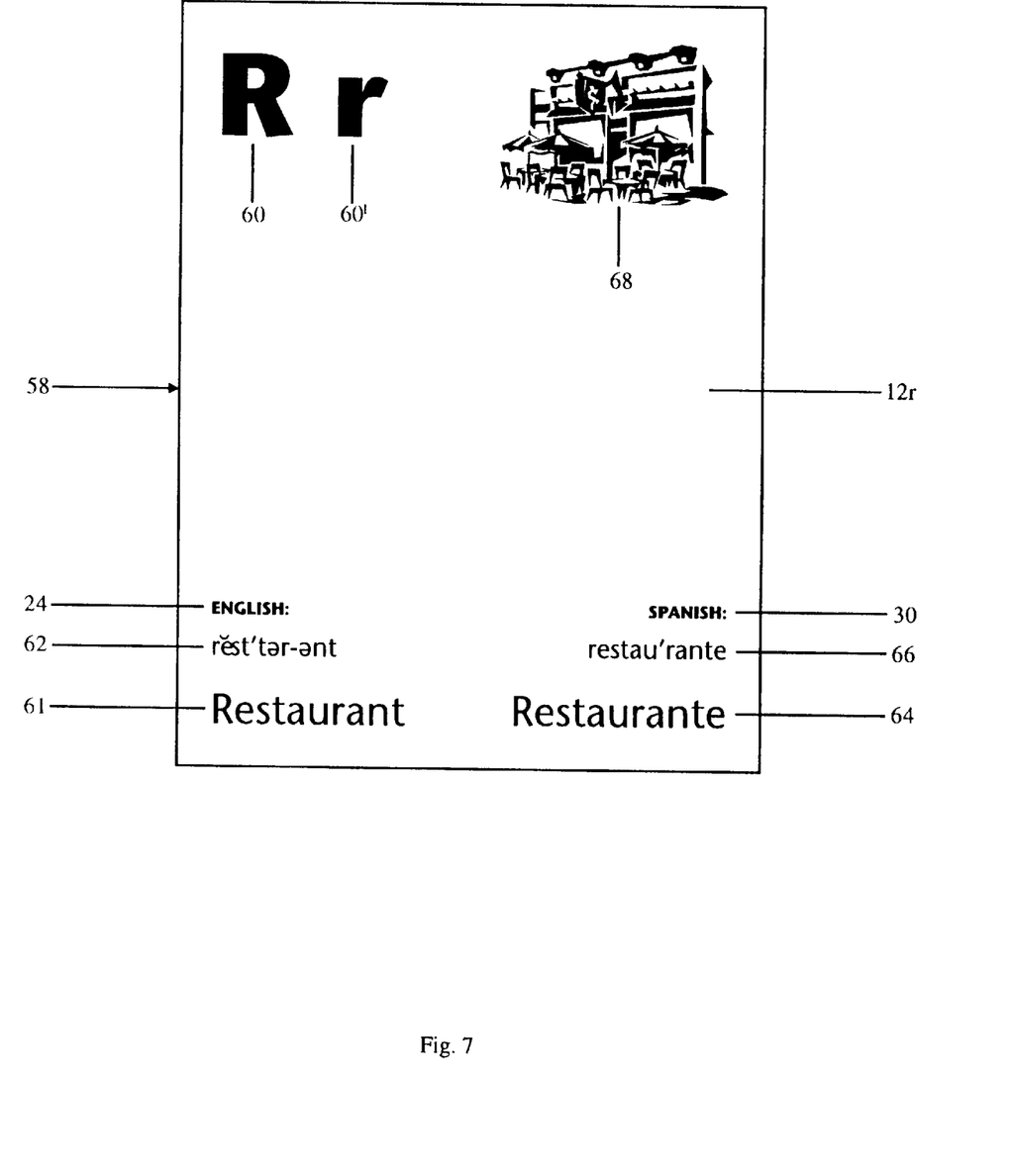
Figure 8:
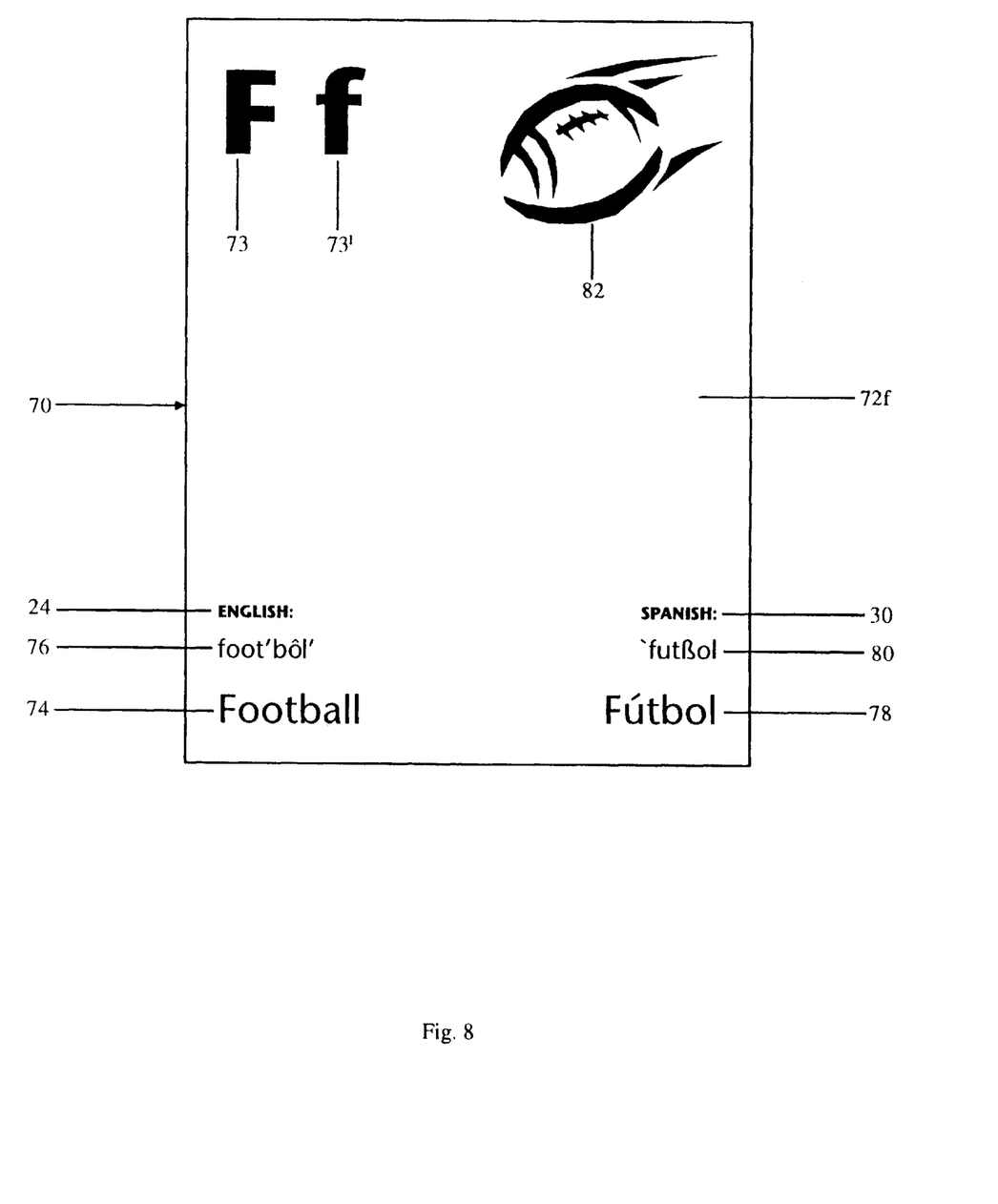

Further alternative embodiments of the pad are shown in FIGS. 7 and 8. The pad of FIG. 7, generally designated by the numeral 58, has a travel-based motif. The illustrated page, 12r, of pad 58 emphasizes the letter "R," which is shown in upper and lower case at 60 and 60' and is used in the word "restaurant," expressed in English and Spanish at 61 and 64; the phonetic equivalents are shown at 62 and 66, and a pictorial illustration is provided at 68. The page 72f from pad 70 uses "football" as a word that is representative of a sports vocabulary, the letter "F" being shown in upper and lower case at 73 and 73' and being expressed in English and Spanish at 74 and 78; corresponding phonetic equivalents are provided at 76 and 80, and a pictorial representation is shown at 82.

It will readily be appreciated that as one writes upon (or otherwise uses) the pads of the invention, each sheet will expose him simultaneously to a word or phrase (including sentences) in two different languages, together with an emphasized significant letter. As a result, the user of the pad may consciously or subconsciously (i.e., intentionally or as an incidental effect) learn an expression in a new language, along with its pronounciation if the pad is so constructed, and letter recognition will (if not already fully developed) be promoted As the user removes sheets from the pad additional translated expressions will be presented, and that may occur either in alphabetical order or as a random arrangement, as may be preferred. Among the advantages afforded by the invention, therefore, are the following:

(a) The user need have no intent to learn a language; i.e., in contrast to prior art translation aids, it provides a natural method of teaching (b) The device may provide phonetic spellings to assist in the pronunciation of translated words.

(c) The device may provide an arrangement of words in alphabetical order to assist in teaching of the alphabet.

(d) It may provide sets of translated words comprising the vocabulary of a specific topic; e.g., words commonly used while traveling, words commonly used in business, words associated with sports, words associated with an age groups or educational levels, etc., thereby adding an interest factor and thus promoting use.

(e) The device may teach translation of phrases (including sentences) as well as single words.

(f) The device may incorporate a pronunciation guide to assist in the pronunciation, and learning, of foreign or second language expressions.

The foregoing description sets forth specific embodiments and the best modes presently contemplated; it should not of course be so construed as to limit the scope of the invention. The device can of course be used to teach virtually any language, and it can be constructed to a wide range of specifications; e.g., in different sizes or shapes, with a variety of colors of ink or paper (or indeed, other sheet materials), etc. The center or writing area of a sheet comprising the device may be left blank, or it can be imprinted with features that are commonly associated with note pads, e.g., designated spaces for shopping lists or for lists of things to do, etc. And finally, although the presence of all of the elements described will be preferred in many instances, it should perhaps be emphasized that certain of them are, as noted, regarded to be optional.

Thus, it can be seen that the present invention provides a device for self-teaching of language translation while, at the same time, promoting letter recognition. Teaching may occur as an incidental effect of a conventional utility, and the pad is so constructed as to encourage use and to facilitate the learning experience.

Having thus described the invention, what is claimed is:

1. A device for teaching expression translation, while also promoting letter recognition, said device being in the form of a note pad and comprising a multiplicity of sheets of paper stacked one upon another and removably bound together adjacent a common edge, each of said sheets having a writing surface which bears indicia, said writing surface including a substantial blank area for being written upon by the user, and said indicia being comprised of:

first and second expressions, each including at least one word, said first expression being employed in a first language and being formed from letters of which a particular alphabet is constituted, and said second expression being employed in a second, different language and corresponding in meaning to said first expression; and means for distinguishing a particular one of said letters from the other of said letters of which said first expression is formed;

said indicia being different on each of a plurality of said sheets of which said device is comprised, and said each sheet of said plurality of sheets being devoid of other said first and second corresponding expressions, whereby a person knowing said first language may learn expressions in said second language by observing said indicia borne by said sheets in the course of writing thereon.

2. The device of claim 1 wherein said first and second expressions constitute first and second words, respectively.

3. The device of claim 2 wherein said indicia further comprises a phonetic representation of at least one of said first and second words and positioned proximate said at least one of said words.

4. The device of claim 1 wherein said first and second expressions constitute first and second phrases, respectively.

5. The device of claim 1 wherein said means for distinguishing comprises means for emphasizing, in said at least one word of said first expression, said particular letter.

6. The device of claim 5 wherein said means for emphasizing is a mark applied to said particular letter.

7. The device of claim 1 wherein said at least one word of said first expression begins with said particular letter, and wherein said indicia further comprises a representation of said particular letter separate from said first expression, said representation constituting said means for distinguishing.

8. The device of claim 1 wherein said indicia further comprises a pictorial representation corresponding in meaning to said first and second expressions.

9. The device of claim 1 wherein each of at least the majority of letters of which said particular alphabet is constituted is borne on at least one of said sheets of which said device is comprised.

10. The device of claim 9 wherein said sheets are so arranged in said device as to conform to the customary order of said letters in said particular alphabet.

11. The device of claim 1 further including a backing panel underlying said stacked sheets of paper and bearing a guide for pronouncing expressions in said different language.

12. The device of claim 1 wherein said expressions on said plurality of sheets comprise the vocabulary of a common topic.

13. The device of claim 12 wherein said common topic is selected from the group consisting of: travel, sports, business, adult-oriented subjects, adolescent-oriented subjects, and juvenile-oriented subjects.

* * * * *